United States Patent Office 2,834,802
Patented May 13, 1958

2,834,802

SULFONATION OF PETROLEUM OILS

Le Roi Hutchings, Crystal Lake, Ill., assignor to The Pure Oil Company, Chicago, Ill., a corporation of Ohio No Drawing. Application November 26, 1954
Serial No. 471,527

2 Claims. (Cl. 260—504)

This invention relates to a method of preparing sulfonates from hydrocarbon oils and, more particularly, to a method of preventing sludge formation during the stripping of sulfur dioxide from the sulfonated products.

It is known in the art to prepare oil-soluble mixtures of metal salts of both mahogany sulfonic acids and green sulfonic acids in lubricating oils by contacting a mineral lubricating oil with concentrated sulfuric acid. Temperatures of between about 100° F. to 150° F. are used and the resulting mixture of sulfonates is treated with a diluent such as petroleum naphtha or benzene, and immediately neutralized with an alkaline compound. Where sulfur trioxide is used as the sulfonation agent, it is the practice to use a special technique for introducing the sulfur trioxide into the sulfonation reactor, i. e., by suspension in an inert carrying medium, such as a low boiling hydrocarbon. Other investigators have used sulfur trioxide mixed with sulfur dioxide with or without air, and in the gaseous phase as the sulfonation agent. In this operation the green acids separate out as a sludge in the first settling chamber and no sulfur dioxide stripping is employed. In still other prior processes, using oleum dissolved in sulfur dioxide, the sulfur dioxide is stripped by water dilution, which produces heat, or by pressure reduction, generally in two stages. Other patent teach the use of a solvent only to increase the amount of mahogany acid recovered where oleum is the sulfonating agent, and, according to at least one patent, the use of sulfur dioxide is specifically avoided. In some instances the use of an unsulfonatable solvent like acetonitrile is suggested as a direct substitute for sulfur dioxide in the reaction. It is usually desirable to separate the excess sulfonating agent before neutralization. Such processes are described in United States Patents 2,381,708, 2,084,506, 2,448,370, 2,616,936, 2,514,733, 2,358,774 and 2,285,390.

The present invention is based on the discovery that during the separation of sulfur dioxide from the sulfonated reaction mixture in a stripping chamber an insoluble sludge separates, and such separation can be prevented by adding just prior to the stripping operation a mutual solvent selected from the group consisting of those thermally stable, inexpensive, low-boiling aromatic compounds which are miscible in both the hydrocarbon oil and sulfur dioxide phase, such as benzene or toluene or their homologues, and mixtures thereof. Xylene, xylene fractions, and low-boiling aromatic fractions may be used during the stripping operation. A particularly effective solvent comprises xylene fractions having a boiling range of about 275° to 310° F. produced by hydroforming petroleum hydrocarbons. By mutual solvent is meant a solvent which is sulfur dioxide-soluble and oil-soluble. In addition, it has been found that with this procedure waxy materials which otherwise separate out of both phases at below 32° F. are also maintained in a fluid state and the viscosity of the oil phase is considerably reduced.

An object of the invention is to provide a method of recovering oil-soluble metal sulfonates from oil-insoluble sulfonic acids.

Another object of the invention is to increase the quantity of metal sulfonates which can be recovered from sulfonation products made from hydrocarbon oils.

Still another object of the invention is to provide a sludge-free method of stripping sulfur dioxide from the sulfonated reaction mixture.

Other objects of the invention will become apparent from the following description.

In accordance with my invention, I prefer to use as the oil to be sulfonated a Mid-Continent neutral oil fraction which has been solvent refined to a viscosity index of not more than about 100. Although stocks may be used which are more drastically refined, they give a lesser amount of sulfonate since much of the sulfonatable material is removed by the solvent refining process. Unrefined stocks or aromatic extracts produce considerable sludge which is difficult to maintain dispersed in the oil phase. In the event Pennsylvania base stocks are used, no refining prior to sulfonation is required to avoid the formation of considerable sludge. Where Gulf Coast or California base stocks of high naphthenicity are used, solvent refining can be carried to a higher degree than in the case of the Mid-Continent stocks. Any type of solvent refining designed to separate non-aromatic from aromatic hydrocarbons, such as phenol, furfural, liquid sulfur dioxide and nitrobenzene extraction, may be used to prepare the stock. Ordinarily, petroleum lubricating oil fractions having a viscosity from about 40 SSU to 200 SSU at 210° F. are suitable.

In carrying out the present invention, the sulfonating agent is sulfur trioxide diluted with sulfur dioxide. The concentration of the sulfur trioxide is preferably about 5 percent to 20 percent by weight. Contact between the oil and the sulfonating agent is carried out at temperatures below 150° F. and preferably at a temperature of approximately 5° to 32° F. At temperatures above 150° F. undesirable products may form. At temperatures below about —20° F., the sulfonation reaction proceeds too slowly to be practicable. The ratio of sulfonating agent to oil will vary depending principally on the nature of the oil being treated. Oils which have a high content of aromatic hydrocarbons require higher ratios of sulfonating agent to oil to obtain complete sulfonation. In general, from 5 to 15 parts by weight of sulfonating agent to 100 parts of oil undergoing treatment will produce a satisfactory concentrate. When using sulfur dioxide as a diluent in an operation in which gaseous sulfur trioxide is continuously recycled, sufficient superatmospheric pressure is maintained to facilitate solvation of the sulfur dioxide in the organic liquid thereby avoiding build-up of sulfur dioxide in the recycle gas. The time of contact between the sulfonating agent and the oil may vary from approximately one minute to one hour depending upon the temperature, type of contact, nature of the oil, and content of sulfonating agent.

In order to demonstrate the invention, one volume of a 200 vis., 85 V. I., finished neutral oil was sulfonated at 14° F. with two volumes of a sulfonating mixture consisting of sulfur trioxide mixed with sulfur dioxide. The amount of sulfur trioxide used was 8 percent by weight based on the amount of oil and this was mixed with sulfur dioxide equal to approximately 200 percent of the volume of oil. After sulfonation was complete, the reaction mixture was passed into a 3/8" copper tube immersed in boiling water to evaporate the sulfur dioxide. Any heat exchange medium may be used for this purpose as long as sufficient heat is applied to evaporate or distill the sulfur dioxide. The evaporation of the sulfur dioxide caused deposition of tenacious, semi-solid sludge which partially plugged the copper tube and prevented the continuous, smooth flow of mixture therethrough necessary to drive off sulfur dioxide. The calculated sulfonic acids content of the finished product was 49.6 percent by weight.

The foregoing sulfonation was repeated except that after sulfonation was complete one volume of benzene per one volume of oil was added to the mixture before it was introduced into the heated copper tube. In contrast to the difficulties encountered when no benzene was added, no sludge was deposited on the walls of the tube and flow therethrough was smooth and continuous. The calculated sulfonic acids content of the finished product was 53.0 percent. The difference in sulfonic acids contents of the finished products (consisting of oil phase plus sludge phase) was probably due to the mechanical loss of sludge phase resulting from deposition in the stripping tube.

The finished sulfonated product is neutralized, preferably by the use of a considerable excess of basic compound over that required to neutralize the total sulfonation product, to obtain not only a high concentration of sulfonate in the finished product, but also a metal sulfonate which is basic in character. For this purpose, not less than 150 percent of the amount of base theoretically required to neutralize the acidity of the sulfonated oil, and preferably between 150 percent and 300 percent, is used. This neutralization reaction may be carried out in accordance with copending application, Serial Number 397,476, filed December 10, 1952. The neutralization is carried out at temperatures below 200° F. in order to prevent decomposition of the sulfonation products. The sulfur dioxide has been removed by the stripping step and therefore is not present to consume any of the base used in the neutralization. After neutralization, any water formed in the reaction may be stripped from the product by heating it to a temperature of 350° F., under vacuum, with or without the aid of inert stripping gas such as nitrogen, super-heated steam or carbon monoxide. The stripped neutralization product is then filtered to remove products such as unreacted base and inorganic salts. Any base material such as oxides, hydroxides or carbonates or suitable metals may be used in the neutralization. Solid barium hydroxide octahydrate in an amount equal to 300 percent of that theoretically required to neutralize the sulfonated product (based on total acid number) is a suitable neutralizing agent. The neutralizing base is preferably used in finely divided condition and agitation is continued throughout the neutralization until no further change in the basicity of the product occurs. Conventional neutralization employing only a slight excess of stoichiometric amounts of neutralizing agent may also be applied.

In the foregoing example of the invention one volume of mutual solvent per volume of charge oil was used. Since the mixture of charge oil and sulfonating agent both before and after reaction is not homogeneous and contains an oil phase and sulfur dioxide phase, it is important to use a sufficient amount of mutual solvent to cause some of the solvent to be in both phases of the reaction mixture. This amount of mutual solvent comprises about an equal volume of solvent per volume of charge oil as a maximum when using a 4 to 1 sulfur dioxide to charge-oil ratio, and about 10 percent by volume of solvent based on the amount of charge-oil as a minimum. The water-soluble green acids are maintained in solution by the sulfur dioxide. One function of the mutual solvent is to maintain the green acids in fluid condition as they are coming out of the sulfur dioxide phase during its evaporation by the application of heat to the reaction mixture. Another function of the mutual solvent is to maintain the oil phase fluid to prevent the precipitation of waxy constituents and the like. Accordingly, since the mutual solvent is inert and does not enter into the reaction, the use of more than an equal volume thereof based on charcoal is prohibited only for economic reasons. As much as 200 percent by volume of mutual solvent may be used where the sludge problem during sulfur dioxide evaporation is aggravated by inherent qualities of the charge-oil or where less than 4 to 1 sulfur dioxide to charge-oil ratios are employed.

Accordingly, the instant invention may be applied by introducing the mutual solvent into the reaction mixture as it passes to the sulfur dioxide evaporator, producing a mixed phase of reaction products comprising a soluble sludge phase and an oil phase. Upon neutralization, a substantially homogeneous, clear solution is formed because the green acids, normally water-soluble and oil-insoluble have been converted to salts which are somewhat soluble in the mahogany acid salts. This makes possible the separation of the entire oil phase containing the green acid salts and the mahogany acid salts, and greatly facilitates the final purification of these materials by settling and filtering in the conventional manner. The process may be applied to the preparation of free sulfonic acids where the nature of the charge-oil allows.

What is claimed is:

1. The method of preparing petroleum solfonic acids which comprises treating solvent refined neutral oils, having a viscosity index of not more than 100 and obtained as a raffinate from the solvent refining of petroleum lubricating oil fractions of Mid-Continent origin, with a sulfonating agent consisting of sulfur trioxide diluted with sulfur dioxide at a temperature of between about 32° to 50° F. in the liquid phase in a reaction zone, withdrawing the liquid reaction mixture comprising a hydrocarbon oil phase and a sulfur dioxide phase from the reaction zone, introducing into said reaction mixture a mutual solvent miscible with both of said phases, said solvent being selected from the group consisting of benzene, toluene and xylene, the amount of said solvent being at least about 10% by volume based on the amount of said neutral lubricating oil fraction charged and passing the combined mixture to a sulfur dioxide separation stage wherein the sulfur dioxide is separated by the application of heat, thereby preventing the separation of insolubles from said phases.

2. The method in accordance with claim 1 in which the sulfur dioxide to neutral lubricating oil ratio is about 4:1 and the volume of said mutual solvent is substantially equal to the volume of lubricating oil.

References Cited in the file of this patent

UNITED STATES PATENTS

| Re. 22,548 | Brandt | Sept. 26, 1944 |
|---|---|---|
| 2,285,390 | Brandt | June 9, 1942 |
| 2,695,910 | Asseff et al. | May 3, 1951 |
| 2,706,736 | Birch et al. | Apr. 19, 1955 |
| 2,769,836 | Gilbert et al. | Nov. 6, 1956 |

UNITED STATES PATENT OFFICE
CERTIFICATE OF CORRECTION

Patent No. 2,834,802                                                    May 13, 1958

Le Roi Hutchings

It is hereby certified that error appears in the printed specification of the above numbered patent requiring correction and that the said Letters Patent should read as corrected below.

Column 4, line 9, for "charcoal" read -- charge-oil --; line 31, for "solfonic" read -- sulfonic --.

Signed and sealed this 8th day of July 1958.

(SEAL)
Attest:

KARL H. AXLINE                                        ROBERT C. WATSON
Attesting Officer                                     Commissioner of Patents